(12) United States Patent
Sharma et al.

(10) Patent No.: US 6,778,670 B1
(45) Date of Patent: Aug. 17, 2004

(54) METHOD AND APPARATUS FOR ENCRYPTION AND DECRYPTION

(75) Inventors: Sandhya Sharma, Austin, TX (US); Jagannathan Bharath, Eldorado Hills, CA (US); David N. Larson, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/373,934

(22) Filed: Aug. 13, 1999

(51) Int. Cl.[7] .............................. H04L 9/00; H04K 1/00
(52) U.S. Cl. ....................... 380/262; 380/261; 380/270; 380/265; 380/274
(58) Field of Search ................... 380/265, 261–262, 380/270, 274

(56) References Cited

U.S. PATENT DOCUMENTS

| | | | | |
|---|---|---|---|---|
| 4,893,339 A | * | 1/1990 | Bright et al. ................. | 380/28 |
| 5,195,136 A | | 3/1993 | Hardy et al. .................. | 380/43 |
| 5,243,653 A | * | 9/1993 | Malek et al. ................ | 380/272 |
| 5,258,985 A | * | 11/1993 | Spence et al. .............. | 714/732 |
| 5,500,899 A | * | 3/1996 | Snow ........................... | 380/47 |
| 5,703,952 A | * | 12/1997 | Taylor .......................... | 380/44 |
| 5,822,314 A | * | 10/1998 | Chater-Lea ................. | 370/337 |
| 6,393,433 B1 | * | 5/2002 | Kalavade et al. ........... | 707/200 |

FOREIGN PATENT DOCUMENTS

| | | | | |
|---|---|---|---|---|
| EP | 0 677 9393 A2 | 10/1995 | ............. | H04L/9/00 |
| EP | 0 779 738 A2 | 6/1997 | .......... | H04N/7/167 |

* cited by examiner

Primary Examiner—Gilberto Barrón
Assistant Examiner—Grigory Gurshman
(74) Attorney, Agent, or Firm—Williams, Morgan & Amerson, P.C.

(57) ABSTRACT

A method and apparatus are provided for encrypting a stream of data transmitted within a frame. The method includes determining a first initialization state in a first preselected interval, and determining the first initialization state in a second preselected interval, wherein the second preselected interval is less than the first preselected interval. The method includes generating a key stream in response to determining the first initialization state in the second preselected interval, and encrypting at least one bit of the stream of data with at least one bit of the key stream.

17 Claims, 8 Drawing Sheets

METHOD AND APPARATUS FOR ENCRYPTION AND DECRYPTION

BACKGROUND OF THE INVENTION

1. Field of the Invention

This invention relates generally to communications systems, and, more particularly, to a method and apparatus for encrypting and decrypting data in a communications system.

2. Description of the Related Art

Modern day electronic products, such as computers and telecommunications devices, are generally faster and more efficient than their predecessors. Two important factors that have contributed to the improved performance of today's electronic products is the efficiency and faster rate at which these products transmit and receive signals. However, given the customer demand for faster and more responsive products, designers are constantly seeking ways to achieve a higher bandwidth while controlling the costs.

The overall performance of applications, particularly real-time telecommunication applications, can be improved by increasing the bandwidth available for transmitting signals. One example of a real-time telecommunication application where an increased bandwidth is desirable is a Wireless Local Loop (WLL) network.

Wireless Local Loop is quickly emerging as the technology that promises to deliver telephone service in geographical areas where using conventional copper telephone lines is cost prohibitive, or in a case where a telephone line exists, radio access technologies such as WLL provide other companies an opportunity to provide competitive services. Installing the last quarter of a mile of the telephone wire to a subscriber station is usually one of the most costly portions of the traditional telephone network, primarily because of the expenses associated with labor and maintenance. The telephone companies, which are usually responsible for maintaining the telephone wire, are frequently plagued with the daunting task of repairing the damage to the telephone lines caused by inclement weather, falling trees, digging, and by the recurring problem of copper wire theft. Accordingly, to circumvent the problems that are typically associated with the "traditional" telephone network, system designers turned to WLL technology, which is proving to be a promising and viable alternative.

FIG. 1 illustrates a block diagram of a WLL network 100. The WLL network 100 includes a Wireless Subscriber Unit (WSU) 110 at a subscriber station 115 that communicates with a remote Basestation Transceiver System (BTS) 120. The data flow from the WSU 110 to the BTS 120 is referred to as an uplink connection, and the data flow from the BTS 120 to the WSU 110 is referred to as a downlink connection. The BTS 120 links the WSU 110 to a central office 130, thus allowing a user at the subscriber station 115 to communicate with other subscriber stations (not shown) through the central office 130. A connection 132 between the BTS 120 and the central office 130 may be made via a wire-line, fiber or microwave link, depending on the bandwidth, distance, and the terrain.

The heart of the WLL network 100 is the "wireless" interface between the BTS 120 and the WSU 110, where the need for the copper loop is eliminated. The WSU 10, located in the home or office, provides a radio frequency (RF) interface to an existing phone 135 or modem 140, usually through an RJ-11 type plug (not shown). The connection between the subscriber station 115 and the central office 130 is typically as reliable and clear as the copper wire version.

The counterpart to the WSU 110 is the BTS 120, which is generally located in the field. As is common in most wireless systems, the BTS 120 serves as a control station for the WSU 110 by providing, over a designated pilot channel, synchronization and control information necessary to initiate and maintain two-way communication. In communication systems employing time division multiple access (TDMA), a process well known in the art, the WSU 110 selects the channel frequency and the specific time slot based upon the availability and quality of the channels in the coverage area.

Most wireless communication systems, including the WLL network 100, operate in accordance with industry defined standards. For example, two popular standards for the WLL network 100 are Personal Handyphone System (PHS) and Digital Enhanced Cordless Telecommunications (DECT). The PHS and DECT standards, as well as other WLL standards, define the format for transmitting and receiving data, error checking algorithm, retransmission scheme, and other such parameters that are relevant to wireless communications systems.

The DECT standard for the WLL network 100, for example, defines a 10-millisecond TDMA frame that comprises twenty-four time slots, where generally twelve slots are reserved for transmitting and twelve for receiving. DECT supports voice, analog data, and packet data communications. Voice and analog data communications are full duplex, whereas packet data communications are simplex in nature. Packet data communications can take advantage of directing all slots in one direction, uplink or downlink, with the exception of one slot for the reverse acknowledgement channel. Depending upon the bandwidth allocated by the system, an uplink or downlink channel can utilize between one and twenty-three slots for transferring packet data. When no data is waiting to be sent, the bandwidth is de-allocated and assigned to other users. Thus, in an uplink connection, the BTS 120 of the WLL network 100 can transmit data on up to twenty-three slots that are allocated for transmitting data per each frame to the WSU 110. Assuming all of the data is successfully transmitted over the twenty-three time slots, then new data may be transmitted on the twenty-three transmit time slots of the next frame. On the other hand, if not all of the data is successfully transmitted to the BTS 120 because of transmission errors, then that data is retransmitted over the twenty-three transmit time slots in accordance with the DECT retransmission scheme.

The retransmission scheme of a DECT WLL network 100 requires an acknowledgement to be generated by the peer station on a slot-by-slot basis for duplex bearers. Double simplex bearers' acknowledgements are on a logical bearer number (LBN) basis contained in a MAC-MOD2-ACK message in a reverse bearer. The BTS 120 or the WSU 110 may be the peer station, depending on whether the connection is an uplink or downlink connection. That is, in an uplink connection, the BTS 120 is the peer station, and in a downlink connection, the WSU 110 is the peer station. A "good" acknowledgement, a request to advance, from the peer device indicates a good transmission and new data should be transmitted in the next frame. On the other hand, a "bad" acknowledgement, a request to retransmit, indicates a bad transmission, and thus requires retransmission of data that was not received correctly by the peer station.

In communications systems, particularly real-time in communications systems, it is desirable to have the ability to quickly and efficiently encrypt and decrypt data. Efficient means of encryption and decryption can generally enhance the overall performance of the communications systems. One communications system that employs encryption and decryption is the DECT WLL network 100.

In the WLL network 100, the exchange of data between the WSU 110 and the BTS 120 occurs at very high speeds, and generally involves encryption on the transmitting end and decryption on the receiving end. Data is typically encrypted using a unique cipher key, which is also then required for decryption to recover the original data. A variety of encryption algorithms may be employed in communications systems. For example, in the DECT WLL network 100, encryption of a serial data stream involves generating, based on the cipher key, a key stream sequence of a length same as that of the data stream and then performing an exclusive "OR" of the data stream with the key stream. And, for decryption of a data stream encrypted in such a manner, the same key stream needs to be generated and exclusive ORed with it to recover the original data. The key stream is generally generated by a key stream generator (KSG) (not shown) in response to a given cipher key.

The WSU 110 of the DECT WLL network 100 encrypts data on a channel by channel basis, where each channel comprises a pair of slots of a DECT frame. The pair of slots are typically 12 slots apart (i.e., slot i and i+12). For a given connection, each channel has a unique cipher key that is assigned to the connection by the BTS 120. For each slot, at least 360 bits are encrypted. So, for a given channel (i.e., a pair of slots), a total of 720 bits are encrypted. Accordingly, to encrypt data for a given channel, the KSG generates a 720 bit random number (i.e., the key stream sequence) based on the cipher key designated for that channel. The first 360 bits of the 720 key stream sequence are utilized to encrypt the bits for slot i, a slot in the first half of the frame. The remaining 360 bits of the 720 key stream sequence are utilized to encrypt the bits for slot i+12, a complementary slot in the second half of the frame. The KSG is generally capable of generating the first 360 bits of the 720 key stream sequence for slot i within the allotted time. However, generating the second 360 bits of the 720 key stream sequence for slot i+12 may be problematic, as the first 360 bits of the 720 key stream sequence generally have to be generated before encryption of the bits for the slot i+12 may begin. Accordingly, the KSG may not be capable of generating the required key stream sequence for encryption within the allotted time before the data in the next slot is ready for encryption.

The present invention is directed to overcoming, or at least reducing the effects of, one or more of the problems set forth above.

SUMMARY OF THE INVENTION

In one aspect of the present invention, a method is provided for encrypting a stream of data transmitted within a frame. The method includes determining a first initialization state in a first preselected interval, and determining the first initialization state in a second preselected interval, wherein the second preselected interval is less than the first preselected interval. The method includes generating a key stream in response to determining the first initialization state in the second preselected interval, and encrypting at least one bit of the stream of data with at least one bit of the key stream.

In another aspect of the present invention, an apparatus is provided that includes a generator and first, second, third logic. The first logic is capable of determining a first initialization state in a first preselected interval. The second logic is capable of determining the first initialization state in a second preselected interval, wherein the second preselected interval is less than the first preselected interval. The generator is capable of generating a key stream in response to determining the first initialization state in the second preselected interval. The third logic is capable of encrypting at least one bit of the stream of data with at least one bit of the key stream.

BRIEF DESCRIPTION OF THE DRAWINGS

The invention may be understood by reference to the following description taken in conjunction with the accompanying drawings, in which like reference numerals identify like elements, and in which.

Figure 1:
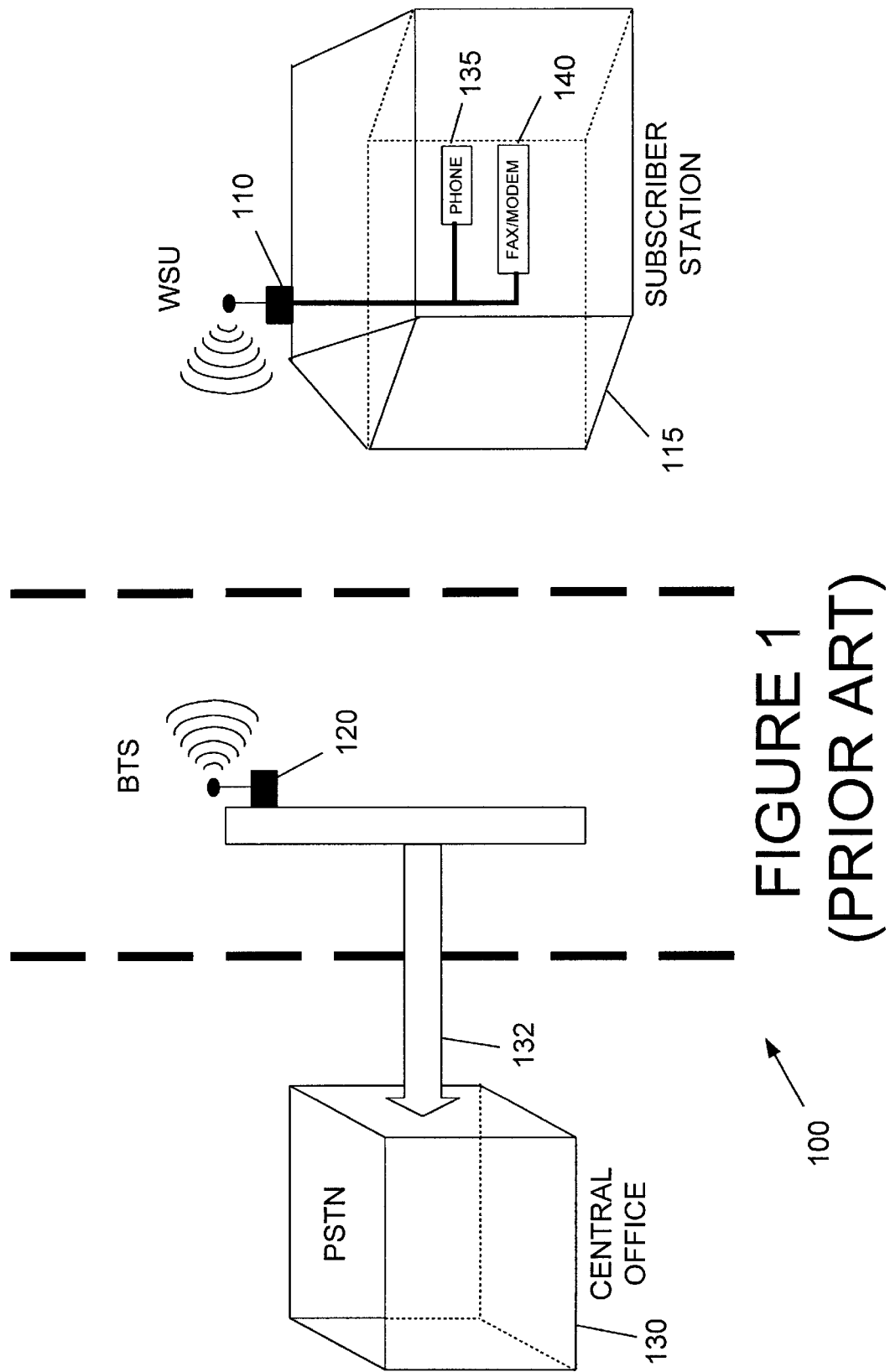
FIG. 1 is a prior art illustration of a stylized block diagram of a WLL network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
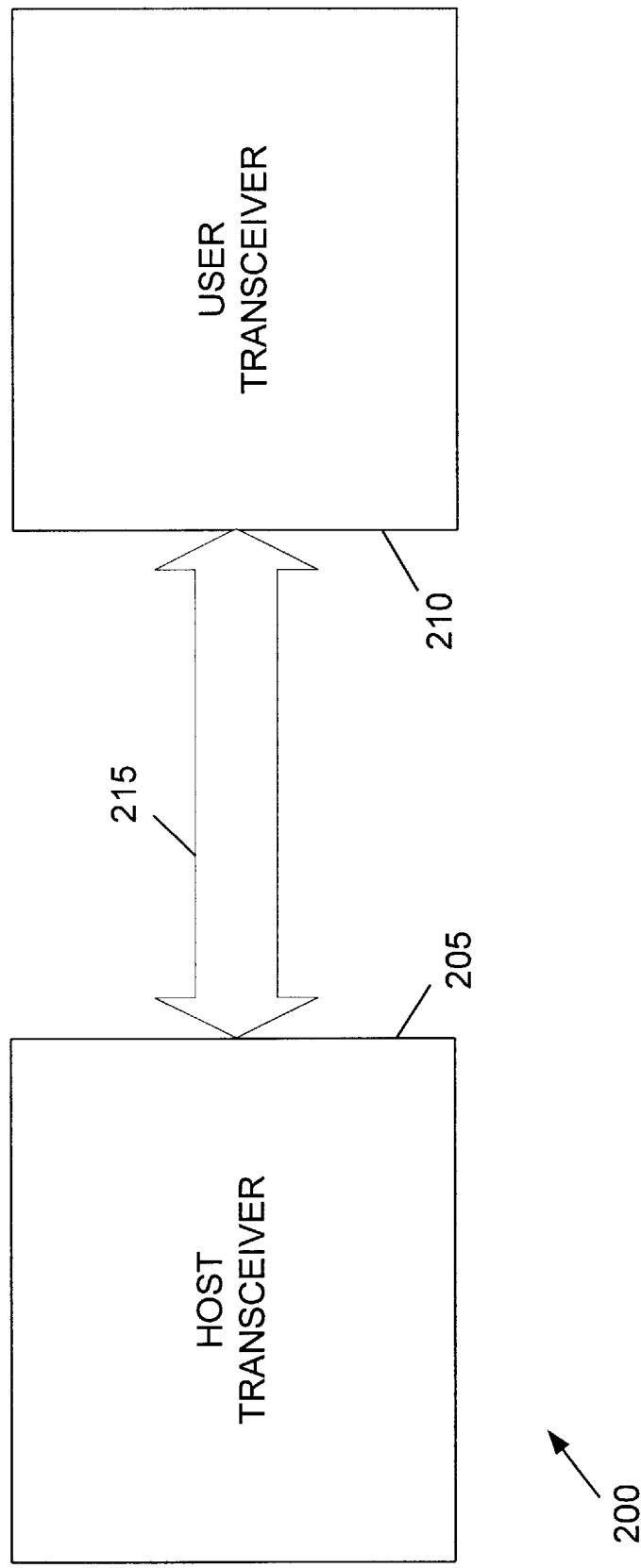
FIG. 2 illustrates a communications system in accordance with the present invention.

Referring now to the drawings, and in particular to FIG. 2, a communications system 200 in accordance with the present invention is illustrated. The communications system 200 includes a host transceiver 205 and a user transceiver 210 capable of communicating with each other over a connection 215. The connection 215 may be either a wire-line connection or a wire-less connection, depending on the application. Generally, the host and user transceiver 205, 210 communicate with each other using a common communications protocol (i.e., a communications standard such as DECT, PHS, NETBIOS, TCP/IP, etc.) that defines the transmission parameters, such as the format of data to be transmitted, error checking algorithm, retransmission scheme, and the like. In one embodiment, the host and user transceivers 205, 210 may be a pair of modems or fax machines. In an alternative embodiment, the host transceiver 205 may be a base station for a cellular telephone network or a WLL network, and the user transceiver 210 may be a cellular telephone of the cellular telephone network or a wireless subscriber unit (WSU) of the WLL network.

Figure 3:
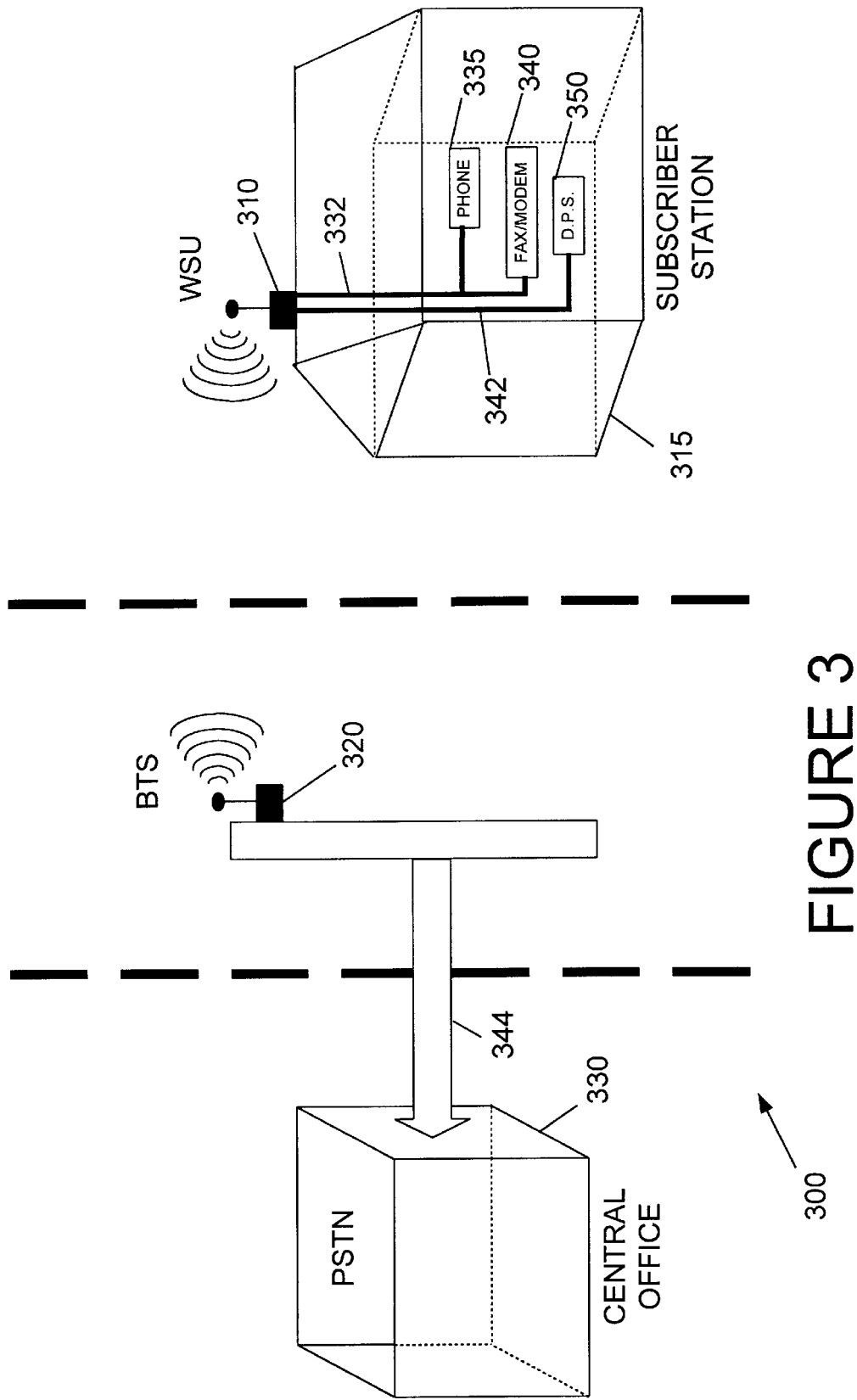
FIG. 3 illustrates a block diagram of a WLL network in accordance with the present invention.

FIG. 3 illustrates a stylized block diagram of an alternative embodiment of a communications system 300 in accordance with the present invention. Specifically, the communications system 300 in the illustrated embodiment is a WLL network 300, where the user transceiver 210 is a Wireless Subscriber Unit (WSU) 310 located at a subscriber station 315, and the host transceiver 205 is a remote Basestation Transceiver System (BTS) 320. The BTS 320 links the WSU 310 to a central office 330, thus allowing a user at the subscriber station 315 to communicate with other subscriber stations (not shown) through the central office 330. In the illustrated embodiment, the WSU 310 is capable of supporting voice and/or data communications. Specifically, the WSU 310 supports a single analog line 332 for a telephone 335 or a modem 340 to use, as well as a data line 342 for providing packet switched data access to a data processing system 350. In some cases the data line 342 can be removed and data can be modulated to share the same line 332 as that used for voice. This requires a specialized data modem (not shown) within the WSU 310 and data processing system 350. A connection 344 between the BTS 320 and the central office 330 may be made via a wire-line, fiber or microwave link, depending on the bandwidth, distance, and the terrain.

One popular WLL protocol is the DECT protocol, which is based on a micro-cellular radio communication system that provides low-power radio (cordless) access, at least as it pertains to the WLL network 300, between the WSU 310 and the BTS 320 at ranges up to a few hundred meters. The DECT protocol is described in the European Telecommunications Standard, ETS 300 175 (Parts 1 through 9) (1996), entitled "Radio Equipment and Systems (RES); Digital Enhanced Cordless Telecommunications (DECT); Common Interface (CI)," which is incorporated herein by reference in its entirety. Other pertinent DECT protocol references include ETR 185, entitled "Radio Equipment and Systems (RES); Digital European Cordless Telecommunications (DECT); Data Services Profile (DSP); Profiles Overview"; ETS 300 765-1, ETS 300 765-2, entitled "Radio Equipment and Systems (RES); Digital European Cordless Telecommunications (DECT); Radio in the Local Loop (RLL) Access Profile (RAP); Part 1: Basic telephony services"; ETS 300 765-2, entitled "Radio Equipment and Systems (RES); Digital European Cordless Telecommunications (DECT); Radio in the Local Loop (RLL) Access Profile (RAP); Part 2: Advanced telephony services"; Draft EN (reference number not yet assigned), V0.0.1 (1998-11), entitled "Digital European Cordless Telecommunications (DECT); Data Services Profile (DSP); DECT Packet"; EN 300 435, entitled "Radio Services (DPRS) Digital European Cordless Telecommunications (DECT); Data Services Profile (DSP); Base standard including inter-working to connection-less networks (Service types A and B, class 1)"; and EN 300 651, entitled "Digital European Cordless Telecommunications (DECT); [Inventors: insert the DECT reference for encryption/decryption here];Data Services Profile (DSP); Generic data link service (service type C, class 2)," which are incorporated herein by reference in their entirety. Exemplary technical characteristics of the DECT protocol are shown below in Table 1.

TABLE 1

| Technical Characteristics for DECT protocol | |
|---|---|
| Frequency Band | 1880–1900 MHz |
| Number of Carriers | 10 |
| Carrier Spacing | 1.728 MHz |
| Peak Transmit Power | 250 mW |
| Carrier Multiplex | TDMA; 24 slots per frame |
| Frame Length | 10 ms |
| Basic Duplexing | TDD using 2 slots on same RF carrier |
| Gross Bit Rate | 1152 kbit/sec |
| Net Channel Rates | 32 kbit/sec B-field (traffic) per slot |
| Packet Data (effective bit rate) | 552 kbit/sec |

FIG. 4a illustrates a stylized block diagram of one embodiment of the WSU 310 in accordance with the present invention. The data processing system 350, the phone 335, and the modem 340 provide packet data, voice data, and modem data, respectively, to the WSU 310, which then transmits the data to the BTS 320. The data processing system 350 is capable of providing packet data to a network controller 420 of the WSU 310 through a network card (not shown), such as a token ring card, an Ethernet card, a PCnet card, and the like. A Subscriber Line Interface Circuit (SLIC) 430 of the WSU 310 provides the voice/modem 335, 340 interface. A WLL controller 440 formats the packet, voice, and modem data according to the DECT protocol and then interfaces it to a radio module 450 for transmission and reception. Similarly, the WLL controller 440 is also responsible for processing received DECT frames, decoding and storing protocol messages, and directing the user information to an appropriate destination.

The packet data is provided by the data processing system 350 to the network controller 420, which formats the packet data into smaller sized protocol data units (PDUs) and stores the PDUs in an external memory 460 of the WSU 310. The external memory 460 acts as a buffer to the WLL controller 440 because the WLL controller 440 is generally unable to transmit the packet data at the rate the data is provided to the WLL controller 440 by the data processing unit 350. Accordingly, the PDUs are stored in the external memory 460 by the network controller 420, and later retrieved by the WLL controller 440 for transmission on an as needed basis.

The DECT protocol currently defines packet data support as standard U-plane service, LU2 class 1 with Medium Access Control (MAC) layer $I_P$ error correction (commonly referred to as MOD2-ARQ). The Data Link Control (DLC) layer U-plane utilizes the $I_P$ channel with the protected mode MAC layer procedure. The protection mode specified is the modulo-2 $I_P$ retransmission scheme for the forward channels and error detection based on the acknowledgement provided by a reverse bearer. There are two types of data bearers, a duplex and double simplex bearer. The flow of data in a duplex bearer slot is bi-directional, while the flow of the data for double simplex bearers is unidirectional.

The functionality of the WLL controller 440 may be controlled by software, hardware, or any combination thereof. Although not so limited, in the illustrated embodiment, the software handles the higher levels of functionality that include portions of the Medium Access Control (MAC) layer, the Data Link Control (DLC) layer. The software may also perform other control functions for the WLL controller 440, such as defining the modes of operation, ascertaining the slots and frequencies that are to be utilized, and determining the timing configurations for the radio control signals.

Figure 5:
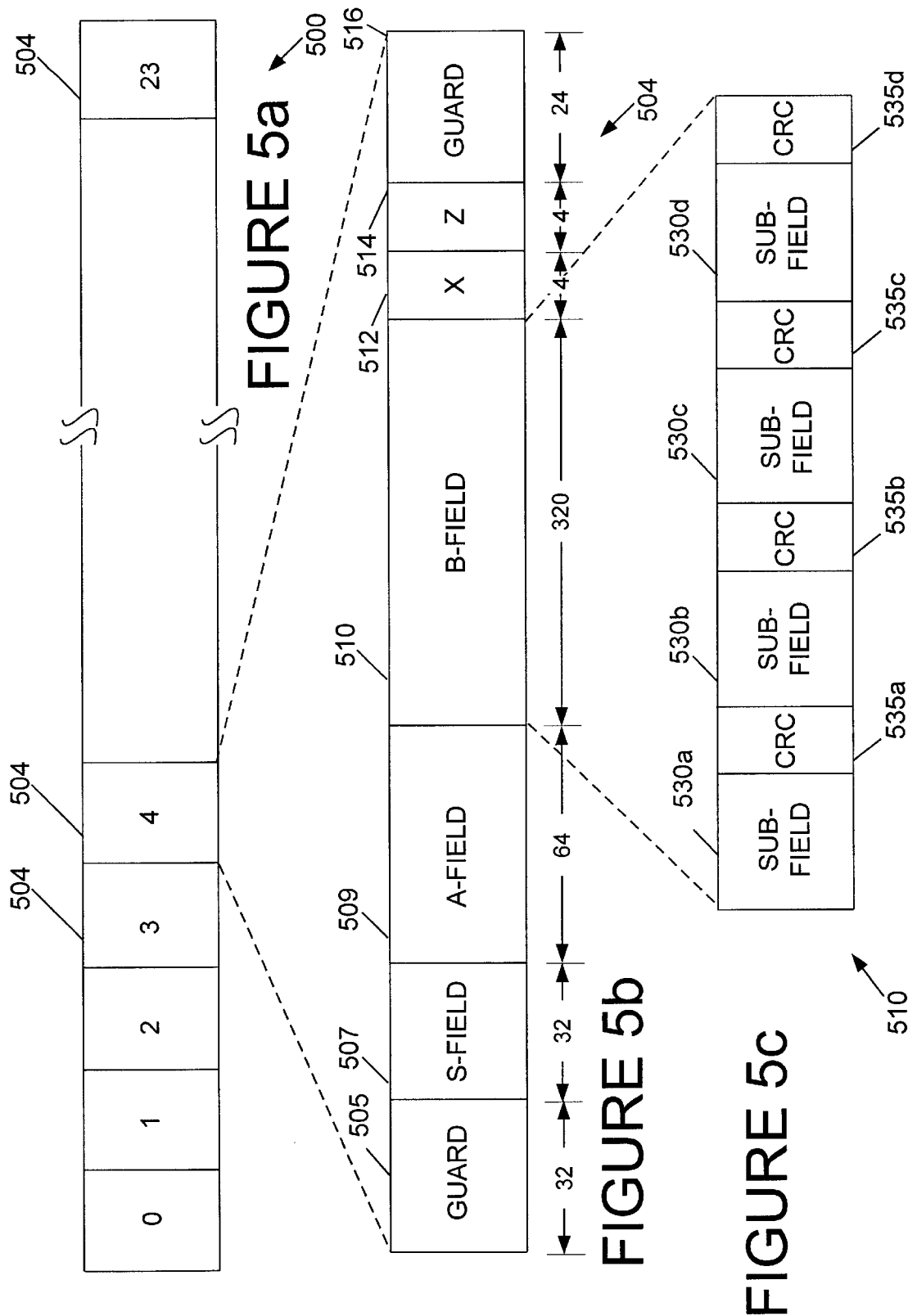
FIGS. 5*a–c* illustrate a DECT frame that may be utilized for transmitting packet data in accordance with the present invention.

FIG. 5a illustrates a DECT (TDMA) frame 500 that may be utilized by the present invention. It is contemplated that the present invention is applicable to a variety of communications systems employing TDMA technology. However, for illustrative purposes, the present invention is described with respect to the DECT TDMA frame 500. The frame 500 is of a 10 millisecond duration and is divided into 24 slots, grouped as twelve receive and twelve transmit slots. FIG. 5b illustrates a slot (commonly referred to as "full" slot) 504 of the frame 500. The slot 504 of the frame 500 includes a first guard band 505, an S-field 507, an A-field 509, a B-field 510, an X and Z field 512, 514, and a second guard band 516. The first guard band 505 includes 32 bits, whereas the second guard band 516 comprises 24 bits. The X and Z fields 512, 514 are each 4 bits, and the S-field, A-field, and B-field 507, 509, 510 are 32, 64, 320 bits, respectively. The DECT protocol, in addition to the "full" slot, is also capable of supporting a "double" slot, wherein the double slot includes larger number of bits than the "full" slot. For example, the B-field of the double slot comprises 800 bits.

FIG. 5c illustrates a more detailed diagram of the B-field 510 that is utilized for transferring packet data in the protected mode. Specifically, the B-field 510 of the frame 500 includes four sub-fields 530(*a–d*) (hereinafter referred to as "data fields"), wherein a corresponding error detection field 535(*a–d*) protects each data field 530(*a–d*). Although not so limited, in the illustrated embodiment, the error detection fields 535(*a–d*) are Cyclic Redundancy Code (CRC) fields. Cyclic redundancy checking is a method of checking for errors in data that has been transmitted on a communications link. The transmitting device (i.e., either the WSU 310 or BTU 320) applies a 16- or 32-bit polynomial to each data field 530(*a–d*) that is to be transmitted and appends the resulting cyclic redundancy code (CRC) to each data field 530(*a–d*). The receiving end (i.e., either the WSU 310 or BTU 320) applies the same polynomial to the data and compares its result with the result appended by the sender. If they agree, the data within the data fields 530(*a–d*) has been received successfully. If not, the sender can be notified to retransmit the data. The data fields 530(*a–d*) hold packet data that is transferred to and from the WSU 310, and the CRC fields 535(*a–d*) are utilized to determine the integrity of the packet data stored in the data fields 530(*a–d*). Each data field 530(*a–d*) in the illustrated embodiment, as defined by the ETSI, comprises 64 bits, and each CRC field 535(*a–d*) comprises 16 bits. The terms "field" and "data field," as utilized herein, refer to at least a portion of the frame 500, and thus may include one or more bits of the frame 500.

The WLL controller 440 is capable of supporting voice, analog data, and packet data communications. According to the DECT protocol, the voice and analog data communications are full duplex, and packet data communications is simplex. Accordingly, for voice and analog data communications, the first-half of the frame 500 data is typically utilized for receiving data from the BTS 320, and the second-half of the frame 500 is utilized for transmitting data to the BTS 320. Thus, data received within slots 0 through 11 is decrypted, whereas data for slots 12–24 is encrypted before it is transmitted. For packet data communications, it is possible to negotiate an asymmetric connection where up to 23 slots may be allocated for either an upstream or a downstream connection. Although the present invention will generally be described with respect to encryption/decryption of voice and analog data, the instant invention is equally applicable to encryption/decryption of packet data. Whenever helpful, occasional references to encryption/decryption of packet data will be made.

Figure 4:
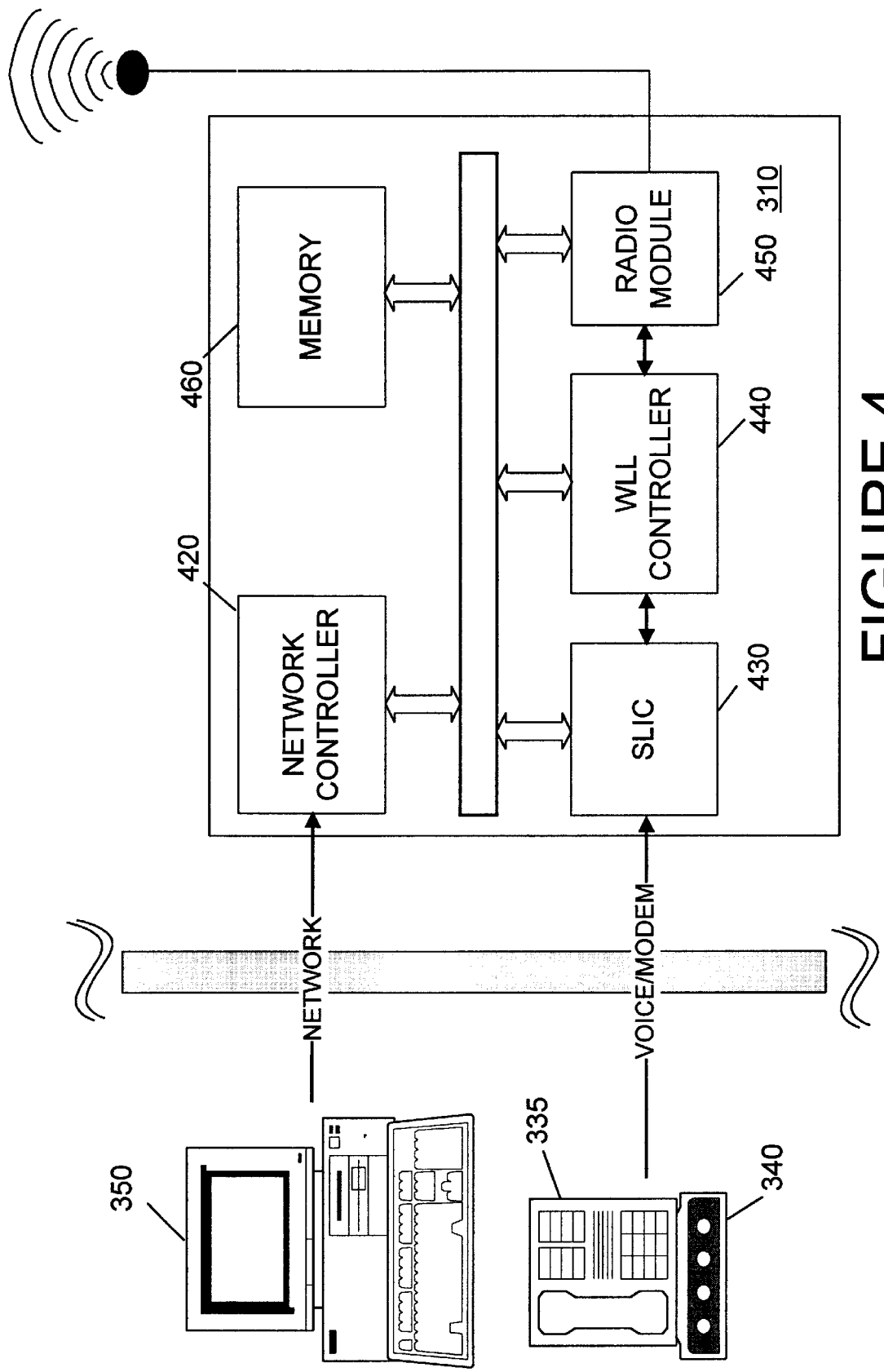
FIG. 4 depicts a Wireless Subscriber Unit of the WLL network of FIG. 3 in accordance with the present invention.
Figure 6:
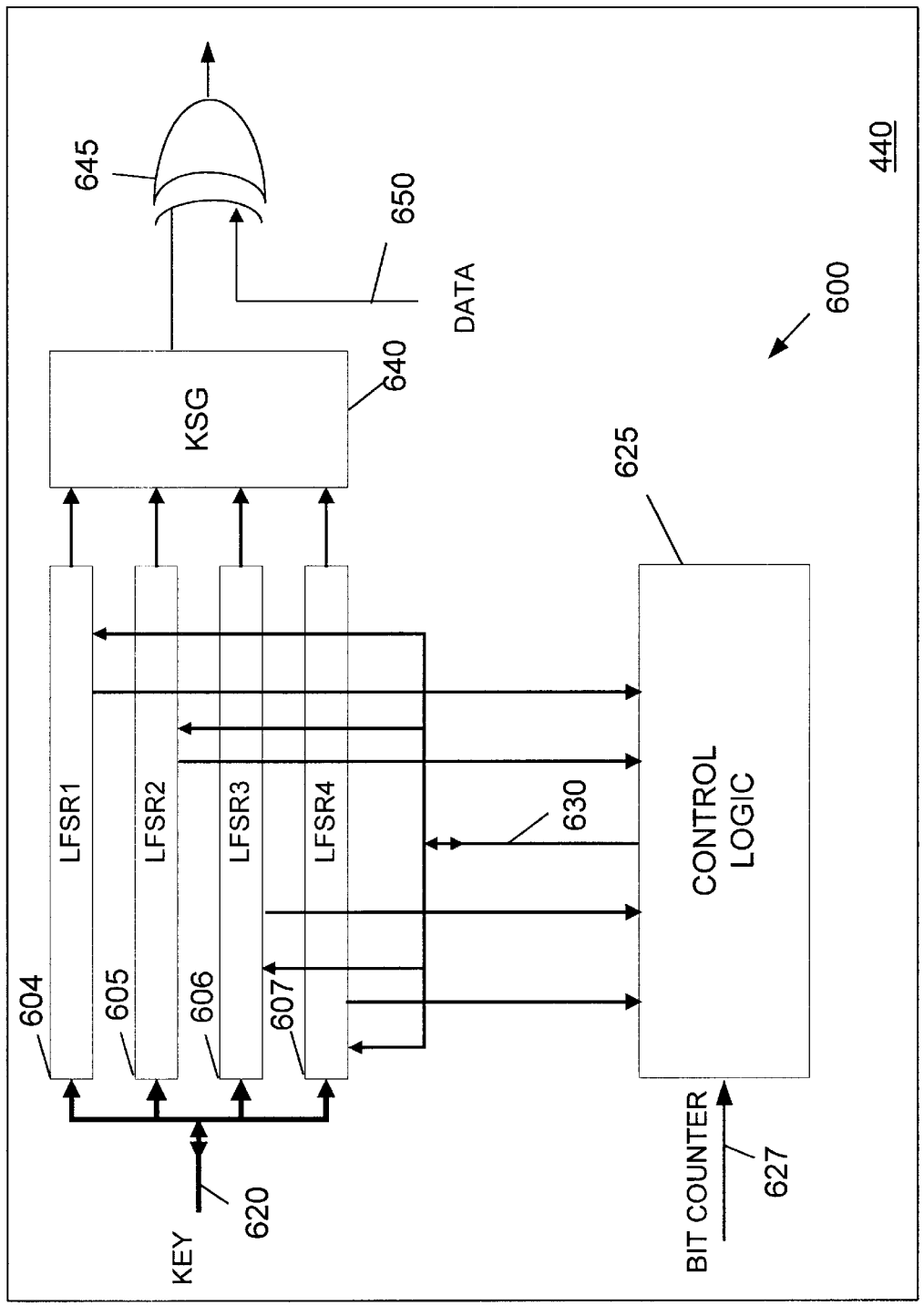
FIG. 6 depicts one embodiment of a WLL controller that may be employed in the Wireless Subscriber Unit of FIG. 4.

FIG. 6 illustrates one embodiment of the WLL controller of FIG. 4 in accordance with the present invention. In the interest of clarity and to avoid obscuring the invention, only that portion of the WLL controller 440 that is helpful in understanding the invention is illustrated. More specifically, FIG. 6 illustrates a portion of the WLL controller 440 that is utilized for encrypting (i.e., during the encryption mode) data that is subsequently transmitted to the BTS 320 or decrypting (i.e., during the decryption mode) data received from the BTS 320. The WLL controller 440 includes encryption/decryption (E/D) logic 600 that encrypts and decrypts data transmitted and received within the frame 500 by the WLL controller 440. In the decryption mode, the E/D logic 600 decrypts encrypted data received from BTS 320, and in the encryption mode, the E/D logic 600 encrypts data for transmission to the BTS 320. The WLL controller 440 of the WSU 310 and the BTS 320 encrypt and decrypt data in accordance with the encryption/decryption algorithm of the DECT protocol.

The E/D logic 600 comprises a first, second, third, and fourth linear feedback shift register (LFSR) 604, 605, 606, 607, wherein the LFSRs 604–607 are utilized to implement a random generating function, $f$. An example of a random generating function is supplied ETSI for at least the DECT protocol. Generally, function f can be factored into prime factors, where each LFSR 604–607 implements one of the prime factors of function $f$. It is contemplated that number of LFSRs 604–607 employed in a given embodiment may vary from one application to another, depending on the random generating function to be implemented. In the instant embodiment, the LSFRs 604–607 comprise of a plurality of D-flip flops (not shown) and XOR gates (not shown), although other logic circuitry may also be employed without deviating from the spirit and scope of the invention. LFSRs 604–607 are well-known in the art, and, accordingly, will not be described in detail herein. A serial stream of bits are provided to the LFSRs 604–607 on line 620, which are then shifted by the LFSRs 604–607 in response to a shift signal provided by a control logic on line 630. The control logic 625 controls the LFSRs 604–607. A bit counter signal is provided to the control logic 625 on line 627.

The E/D logic 600 includes a key stream generator (KSG) 640 that selects output of selected D-flip flops (not shown) of the LFSRs 604–607 to compute the desired function $f$. The E/D logic 600 further includes an exclusive OR (XOR) gate 645. The KSG 640, based on output from selected D-flip flops of the LFSRs 604–607, provides a key stream to a first input terminal of the XOR gate 645, and a data stream requiring encryption or decryption is provided to a second input terminal of the XOR gate 645 on line 650. For encryption, the data processing system 350, the telephone 335 or the modem 340 provides the data stream to the second input terminal of the XOR gate 645. For decryption, the data stream provided to the second input terminal of the XOR gate 645 is received from the BTS 320. The XOR gate 645 performs an exclusive OR of the data stream with the key stream that provided to its two input terminals. The encrypted data stream is subsequently transmitted to the BTS 320, and the decrypted data stream is ultimately forwarded to the data processing unit 350, the telephone 335, or the modem 340.

In accordance with the DECT protocol, to decrypt data received in the first-half (slots 0 to 11) of the frame 500, the KSG 640 generates the key stream by first initializing the LFSRs 604–607 with a cipher key and an initialization vector. Cipher key is a programmed variable and is unique to each channel, where each channel comprises a pair of slots 504 that are spaced twelve slots 504 apart. The initialization vector is derived from variables related to the slot and frame counters (not shown). The cipher key and initialization vector, each being 64 bits, are serially shifted into the LFSRs 604–607 from the line 620. Initializing the LFSRs 604–607 with the cipher key and initialization vector takes 128 clock cycles. Next, the LFSRs 604–607 are pre-clocked for 120 clock cycles while zeros are provided to the LFSRs 604–607 on the line 620. After preclocking, the LFSRs 604–607, or more specifically the flip-flops of the LFSRs 604–607, achieve a particular state, a state that is hereinafter referred to as a "first" state. So far, 248 (120+128) clock cycles have been expended in achieving the "first" state of the LFSRs 604–607.

After the "first" state is achieved, the control logic 600 supplies two clock cycles to the LFSRs 604–607 for each bit to be decrypted. After the two clock cycles, the control logic 600 computes a function, $\alpha_n$, for each LFSR 604–607 based on the output of selected flip-flops of the LFSRs 604–607. Accordingly, in the illustrated embodiment, $\alpha_1$, $\alpha_2$, $\alpha_3$, and $\alpha_4$ are calculated for the first, second, third, and fourth LRSR 604, 605, 606, 607, respectively. The fourth LFSR 607 is supplied a third clock cycle, and if, $\alpha_1$, $\alpha_2$, or $\alpha_3$ equal one, then the respective LFSR 604, 605, 606 for which $\alpha=1$ is also supplied a third clock cycle. If $\alpha_1$, $\alpha_2$, or $\alpha_3$ do not equal one, then the none of the LFSRs 604–607 are supplied the third clock cycle. Therefore, the decryption requires at most 3 clock cycles per bit after the "first" state has been achieved. The key stream generated by the KSG 640 is XORed with the data stream to recover the original data.

Referring again to FIG. 5a and 5b, according to the DECT protocol, the first bit requiring encryption or decryption for a full or double slot is bit 8 of the A-field 509 (e.g., bit 72 of the DECT frame 500). Forty bits of the A-field 509 and all of the bits of the B-field 510 (i.e., 320 bits for a full slot and 800 bits for the double slot) are encrypted or decrypted. Thus, for a full slot, the KSG 640 generates a 360-bit key stream, 40 bits for the A-field 509 and 320 bits for the B-field 510, which is then XORed with the data stream. For a double slot, the KSG 640 generates 840 bits that are XORed with the data stream. It follows that the total number of clock cycles required for decrypting bits of a full slot may be as high as 1328 clock cycles (248 to achieve the "first" state and 360 bits*3 clock cycles per bit). For a double slot, as many as 2768 clocks may be required for decryption. After decrypting a slot (i.e., slot i) in the first-half of the frame, the LFSRs 604–607, or more specifically the flip-flops of the LFSRs 604–607, achieve a particular state, a state that is hereinafter referred to as a "second" state. As described in more detail below, the LFSRs are initialized to the "second" state before the complementary slot, slot i+12, of slot i can be encrypted.

Although not so limited, in the instant embodiment the E/D logic 600 is supplied a 10 MHz clock (not shown). Faster clocks may be provided to the E/D logic 600, but such clocks tend to require more power, which is not conducive for potential wireless applications that may be battery powered or require battery backup. A DECT bit period is 1.152 MHz, which means that for each DECT bit period there are about 9–10 cycles of the 10 MHz clock. From the start of a slot 504 to the first bit of the slot 504 to be encrypted/decrypted, there are 720 (72 bits*10 clock cycles) clock cycles available of the 10 MHz clock. For decryption, the "first" state of the LFSRs 604–607 can be achieved in 248 clock cycles, which is well within the available 720 clock cycles of the 10 MHz clock.

However, because the DECT specification dictates that encryption for the slots 504 in the second-half of the frame 500 begin with the LFSRs 604–607 in the "second" state, the 720 available clock cycles of the 10 MHz clock prove to be inadequate. That is, even before encryption for slot i+12 can begin, the LFSRs 604–607 must be initialized to the "second" state, the state of the LFSRs 604–607 after the generation of the key stream for slot i. Initialization may consume up to 1328 clock cycles (see above) for a full slot and up to 2768 clock cycles (see above) for a double slot. The present invention allows the LFSRs 604–607 to be initialized within the allotted time without a need of a faster clock or additional memory to store the previous states of the LFSRs 604–607.

Figure 7:
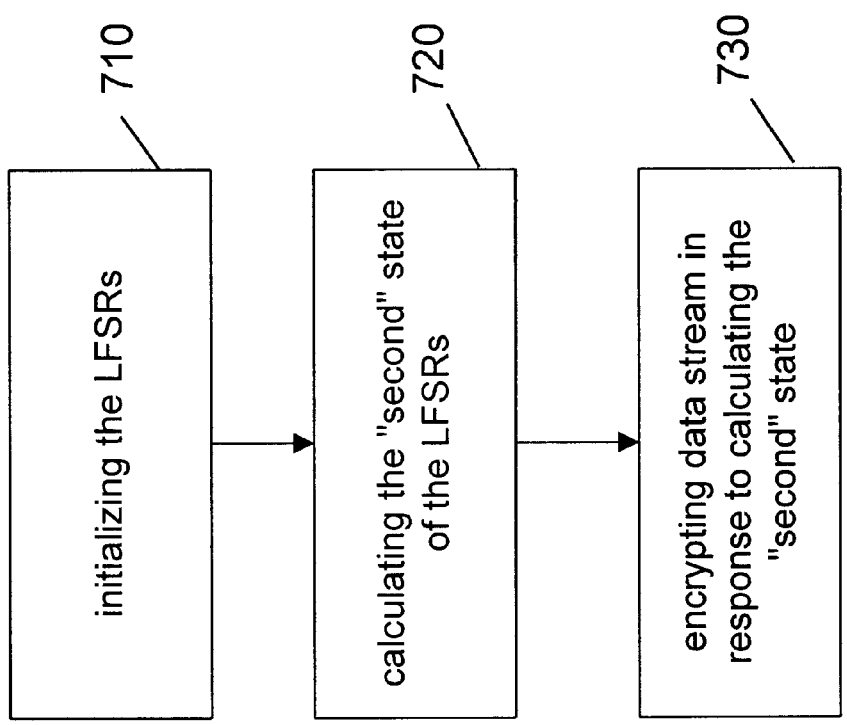
FIG. 7 illustrates one embodiment of a method that may be employed by the the WLL controller of FIG. 6.

FIG. 7 illustrates a method in accordance with the present invention that may be employed by the E/D logic 600 of the WLL controller 440 of FIG. 6. The method of FIG. 7 begins at block 710, where the LFSRs 604–607 are initialized by shifting a 64-bit cipher key and initialization vector. After initialization, the LFSRs 604–607 are at the "first" state. At block 720, the E/D logic 600 calculates the "second" state of the LFSRs 604–607 by skipping intermediate states of the flip-flops of the LFSRs 604–607, a process described in more detail below. At block 730, the E/D logic 600 encrypts the data stream with a second key stream.

Figure 8:
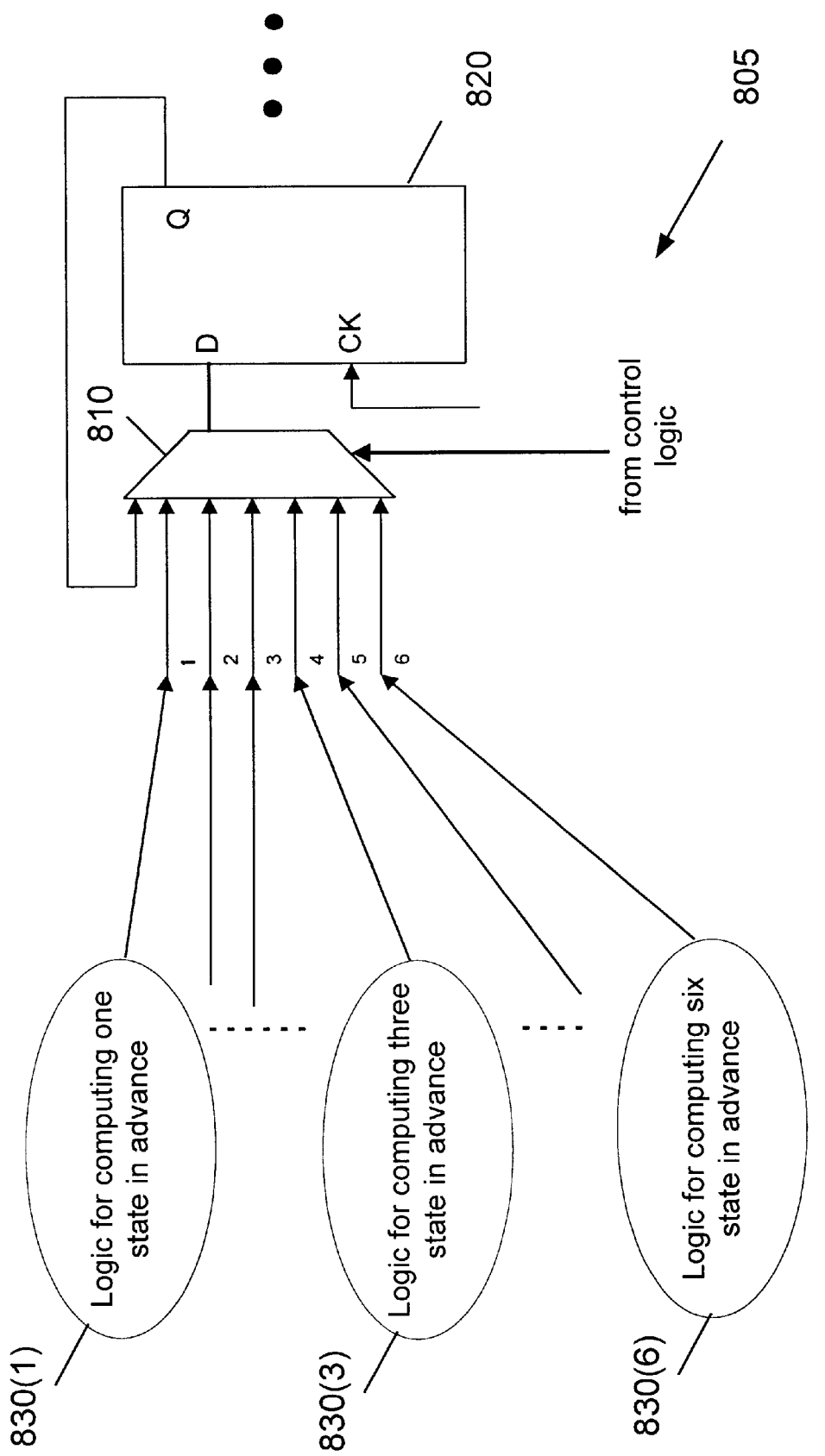
FIG. 8 depicts a portion of a Linear Feedback Shift Register that may be employed in the WLL controller of FIG. 6.

FIG. 8 illustrates a portion 805 of each LFSR 604–607 in accordance with the present invention that may employ the method of FIG. 7 to compute advanced states of the LFSRs 604–607. Specifically, the FIG. 8 illustrates a multiplexer 810 coupled to an input terminal of a D-flip flop 820, and clock (not shown) coupled to a clock terminal of the flip flop 820. The output of the flip-flop 820 may be coupled to additional flip-flops (not shown) as well, depending on the function implemented by the LFSRs 604–607. Each additional flip-flop (not shown) may have a multiplexer (not shown) coupled to its input terminal in manner similar to that shown in FIG. 8. For ease of illustration, only one flip-flop 820 is shown. In the illustrated embodiment, the multiplexer 810 includes seven input terminals and a control input terminal. Based on the signal provided by the control logic 625 to the control input of the multiplexer 810, the multiplexer 810 selects an input signal from its input terminals and provides it to the input terminal of the flip-flop 820.

The first input terminal of the multiplexer 810 is coupled to an output terminal of the flip flop 820. The second input terminal is coupled to logic 830(1) for computing the state of the flip-flop 820 one clock cycle in advance. Similarly, the third, fourth, fifth, sixth, and seventh input terminals of the multiplexer are coupled to respective logic 830(2–6) for computing the state of the flip-flop 820 two, three, four, five, and six clock cycles in advance, respectively. Because LFSRs functions are deterministic, the future values of the LFSRs 604–607 can be computed based on current values. Accordingly, it is possible to determine future values several clocks in advance. For example, in the illustrated embodiment, the states of the flip-flops (e.g., flip-flop 820) of the LFSRs 604–607 may be determined more than one clock cycle in advance. Therefore, each flip-flop of the LFSRs 604–607 may have pre-computed future states that can be selected via the mutliplexer 810. The control logic 625 provides a signal to the control terminal of the multiplexer 810 to select one of the seven available inputs.

Referring again to FIG. 6, as mentioned above, the E/D logic 600, at the block 620, computes the "second" state of the LFSRs 604–607 by skipping intermediate LFSR states. To arrive at the "second" state, the control logic 625 first pre-clocks the LFSRs 604–607 and then shifts twice or three times, depending on the value of $\alpha_n$, for each data bit that is decrypted for slot i in the first-half of the frame. However, the control logic 625 in accordance with the instant invention arrives at the "second" state by using fewer clock cycles than had been previously required for decrypting data from slot i. For example, preclocking in the first-half of the frame 500 required 120 clock cycles. However, because LFSRs functions are deterministic, the future values of the LFSRs 604–607 can be computed based on current values. Accordingly, as illustrated in FIG. 8, logic 830(1–6) is capable of determining the states of the flip-flops of the LFSRs 604–607 one to six clock cycles in advance. Thus, by computing, for example, three states in advance during preclocking stage, it is possible to complete preclocking in 40 clock cycles, rather than the usual 120 clock cycles.

To reach the "second" state after pre-clocking, the LFSRs 604–607 still have to be shifted two to three clock cycles for each bit that was decrypted for slot i in the first-half of the frame 500. In accordance the present invention, and as described below, it is possible to skip intermediate states of the LFSRs 604–607 after preclocking to arrive at the "second" state. Since the state of the LFSRs 604–607 depend on the value of $\alpha_n$, the value of $\alpha_n$ needs to be computed not only based on current states of the LFSRs 604–607 but also on the future states of the LFSRs 604–607. Like the LFSR functions, the $\alpha_n$ function is also deterministic in that future values of $\alpha_n$ may be computed based on current values. Thus, calculating $\alpha_n$ allows one encryption key bit to be generated in one clock cycle, as opposed to 2 or 3 clock cycles. Thus, the total number of clock cycles needed to reach the "second" state for a full slot is 528 clock cycles (i.e., 128 clock cycles for the cipher/initialization vector, 40 for pre-clocking, and 360 for the key stream), as opposed to 1328 clock cycles. For a double slot, the total number of clock cycles needed to reach the "second" state for a full slot is 968 clock cycles (ie., 128 clock cycles for the cipher/initialization vector, 40 for pre-clocking, and 800 for the key stream), as opposed to 2768 clock cycles. Since the "second" state for a full slot can be reached in 528 clock cycles, it is well within the available 720 clock cycles of the 10 MHz clock.

Reaching the "second" state for a double slot, however, requires 968 clock cycles, which is more than the 720 available clock cycles of the 10 MHz clock. To reach the "second" state within the allotted 720 clock cycles, the control logic 625 looks ahead four to six clocks (instead of 2 to 3 clock cycles for a full-slot). This amounts to selecting inputs from 3 to 7 input terminals of the multiplexer 810 in order to generate 2 key-bits per clock cycle. Accordingly, only 400 clock cycles are required to parse the 800-bit key sequence. Thus, the total number of clock cycles needed to reach the "second" state for a double slot is 688 clock cycles (i.e., 128 clock cycles for the cipher/initialization vector, 40 for pre-clocking, and 400 for the key stream).

After the "second" state of the LFSRs 604–607 is reached in either a full or double slot, the E/D logic 600 continues to generate the second key sequence in the usual serial manner to encrypt the bits in the data stream.

As mentioned earlier, the present invention may be employed for encryption/decryption of voice, analog data, or packet data. Generally, the CRC fields 535(*a–d*) in the B-field 510 of the frame 500 are not encrypted or decrypted for packet data transmission. For packet data, each PDU may require encryption/decryption, where each PDU may have its own cipher key. Thus, even in a situation where only one connection exists, there still may be a need to support multiple channels.

The instant invention offers several advantages. First, it is possible to encrypt/decrypt data for multiple channels utilizing a single E/D logic, as opposed to having a dedicated E/D logic for each connection. Second, the present invention allows the LFSRs 604–607 to be initialized to a desired state within a proscribed period without requiring additional memory to store earlier states of the LFSRs 604–607. Up to 1K of memory may be required on-chip to store all the earlier states of the LFSRs 604–607. The extra memory results not only in additional expense, it also consumes valuable space on the chip that may be utilized for other purposes. Third, the instant invention avoids the need of expensive programmable logic arrays to generate the necessary bits in one cycle.

Those skilled in the art will appreciate that the above-described embodiments with respect to the WLL network 300 may also be pertinent with respect to other communications systems 200 (see FIG. 2) as well. Furthermore, although the present invention has been described with reference to communications systems 200, 300, the application of the present invention is not limited as such. It is contemplated that the application of the present invention may be extended to other technologies as well, including, but not limited to, data processing systems and other electronic devices in which encryption and decryption algorithms may be employed.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for encrypting a stream of data transmitted within a frame, comprising:

decrypting one or more bits of data using logic;

determining a first state of one or more storage elements of the logic upon completion of the decryption;

initializing one or more storage elements to the first state to encrypt the stream of data, wherein the one or more storage elements are initialized to the first state by skipping one or more intermediate states to arrive at the first state;

generating a key stream in response to initializing the one or more storage elements of the logic to the first state; and encrypting at least one bit of the stream of data with at least one bit of the key stream, wherein skipping one or more of the intermediate states comprises determining two or more states of a deterministic random number generating function in advance based on one or more preceding states of the function.

2. The method of claim 1, wherein decrypting the one or more bits of data comprises decrypting the one or more bits of data received in a TDMA frame.

3. The method of claim 1, wherein encrypting at least one bit of the stream of data includes performing an exclusive OR function on at least one bit of the stream of data with at least one bit of the key stream.

4. A method for encrypting a stream of data transmitted within a plurality of slots of a frame, comprising:
- determining a first state for decryption of data in a first slot of the plurality of slots of the frame, wherein the first state includes at least two or more preceding states;
- determining the first state in an accelerated manner for encryption of the data stream in a second slot of the plurality of slots of the frame, wherein determining the first state in the accelerated manner comprises skipping at least two or more preceding states to arrive at the first state;
- generating a key stream in response to determining the first state in the accelerated manner; and
- encrypting at least one bit of the stream of data with at least one bit of the key stream, wherein determining the first state in the accelerated manner comprises determining two or more states of a deterministic random number generating function in advance.

5. The method of claim 4, wherein the first and second slots are substantially 12 slots apart.

6. An apparatus for encrypting a stream of data transmitted within a frame, comprising:
- first logic for decrypting one or more bits of received data and for determining a first state of one or more storage elements upon completion of the decryption;
- second logic for initializing one or more storage elements to the first state to encrypt the stream of data, wherein the one or more storage elements are initialized to the first state by skipping two or more intermediate states to arrive at the first state;
- a generator for generating a key stream in response to initializing the one or more storage elements of the logic to the first state; and
- third logic for encrypting at least one bit of the stream of data with at least one bit of the key stream,
- wherein the second logic comprises a deterministic random number generating function, and wherein the second logic is capable of determining two or more states of the deterministic function in advance based on one or more preceding states of the function.

7. The apparatus of claim 6, wherein the second logic comprises:
- a linear feedback shift register; and
- fourth logic capable of determining at least one advance state of the linear feedback shift register.

8. The apparatus of claim 7, wherein the linear feedback shift register comprises a plurality of linear feedback registers.

9. The apparatus of claim 8, wherein the fourth logic is capable of determining at least one advance state of all of the plurality of linear feedback registers.

10. The apparatus of claim 6, wherein the generator is capable of generating the key stream in response to selecting output of at least one of the plurality of linear feedback shift registers.

11. The apparatus of claim 6, wherein the third logic includes an XOR gate capable of encrypting at least one bit of the data within the frame with at least one bit of the key stream.

12. An apparatus for encrypting data transmitted within a frame, comprising:
- a linear feedback shift register representative of a random number generating function;
- control logic for determining at least two states of the linear feedback shift register in advance;
- a generator capable of generating a key stream in response to determining at least two states of the linear feedback shift register in advance; and
- logic for encrypting at least one bit of the stream of data with at least one bit of the key stream, wherein the linear feedback register comprises a plurality of flip-flops, wherein the control logic includes a multiplexer coupled to at least one of the plurality of flip-flops of the linear feed back register the multiplexer being capable of providing at least two advance states of at least two of the plurality of flips-flops of the linear feedback register.

13. The apparatus of claim 12, wherein the generator is capable of generating the key stream in response to selected outputs of a preselected number of the linear feedback shift registers.

14. The apparatus of claim 12, wherein the logic for encrypting includes an exclusive OR gate capable of performing an exclusive OR function on at least one bit of the stream of data with at least one bit of the key stream.

15. A wireless subscriber unit for encrypting a stream of data transmitted within a frame, comprising:
- a controller capable of delivering data within the frame to the radio module, the controller capable of:
  - determining a first initialization state for decrypting data based on calculating two or more previous states;
  - determining the first initialization state in an accelerated manner based on skipping at least two or more previous states;
  - generating a key stream in response to determining the first initialization state in the accelerated manner; and
  - encrypting at least one bit of the stream of data with at least one bit of the key stream; and
- a radio module capable of transmitting the stream of data within the frame,
- wherein the controller capable of determining the first initialization state comprises the controller capable of determining at least two states of a random number generating function in advance.

16. The wireless subscriber unit of claim 15, wherein the controller capable of encrypting at least one bit of the stream of data includes the controller capable of performing an exclusive OR function on at least one bit of the stream of data with at least one bit of the key stream.

17. An apparatus for encrypting a stream of data transmitted within a frame, comprising:
- means for determining a first initialization state for decrypting data based on calculating two or more previous states;
- means for determining the first initialization state in an accelerated manner based on skipping at least one of the two or more previous states;
- means for generating a key stream in response to determining the first initialization state in the accelerated manner; and
- means for encrypting at least one bit of the stream of data with at least one bit of the key stream,
- wherein skipping one or more of the intermediate states comprises determining two or more states of a deterministic function in advance based on one or more preceding states of the function.

* * * * *